US008676473B2

(12) United States Patent
Prodi et al.

(10) Patent No.: US 8,676,473 B2
(45) Date of Patent: Mar. 18, 2014

(54) METHOD FOR THE SELF-LEARNING OF THE VARIATION OF A NOMINAL FUNCTIONING FEATURE OF A HIGH PRESSURE VARIABLE DELIVERY PUMP IN AN INTERNAL COMBUSTION ENGINE

(75) Inventors: Giovanni Prodi, Bologna (IT); Roberto Betro', Soverato (IT); Serino Angellotti, Bologna (IT); Walter Nesci, Sasso Marconi (IT)

(73) Assignee: Magneti Marelli S.p.A., Corbetta (IT)

( * ) Notice: Subject to any disclaimer, the term of this patent is extended or adjusted under 35 U.S.C. 154(b) by 953 days.

(21) Appl. No.: 12/796,338

(22) Filed: Jun. 8, 2010

(65) Prior Publication Data

US 2011/0010078 A1 Jan. 13, 2011

(30) Foreign Application Priority Data

Jun. 9, 2009 (IT) ............................ BO2009A-0374

(51) Int. Cl.

| | |
|---|---|
| ***B60T 7/12*** | (2006.01) |
| ***G05D 1/00*** | (2006.01) |
| ***G06F 7/00*** | (2006.01) |
| ***G06F 17/00*** | (2006.01) |
| ***F02M 59/36*** | (2006.01) |
| ***F02M 57/02*** | (2006.01) |
| ***G01M 15/00*** | (2006.01) |

(52) U.S. Cl.
USPC ......... 701/104; 123/458; 123/446; 73/114.43

(58) Field of Classification Search
USPC ........ 123/179.17, 198 D, 491, 495, 500–503, 123/456–458, 467, 479, 674, 690, 510–512, 123/198 DB; 73/114.41, 114.42, 114.43, 73/114.48, 114.51; 701/104, 106
See application file for complete search history.

(56) References Cited

U.S. PATENT DOCUMENTS 6,966,300 B2 * 11/2005 Fukuda ......................... 123/446
7,848,868 B2 * 12/2010 Nakagawa et al. ............. 701/99
(Continued)

FOREIGN PATENT DOCUMENTS

DE 102006032466 B3 9/2007
DE 102008000164 A1 8/2008
(Continued)

OTHER PUBLICATIONS

Italian Search Report, Nov. 4, 2013.

*Primary Examiner* — Stephen K Cronin
*Assistant Examiner* — Sherman Manley
(74) *Attorney, Agent, or Firm* — Howard & Howard Attorneys PLLC

(57) ABSTRACT

A method for the self-learning of the variation of a nominal functioning feature of a high pressure pump in an internal combustion engine, which pump feeds fuel to a common rail and is controlled by a solenoid valve depending on an objective pressure inside the common rail and by using the nominal functioning feature which provides a delivery of fuel; in cut-off conditions of the engine, the method includes determining the value of the pressure leaks due to blow-by in the common rail; measuring the real pressure of the fuel inside the common rail; actuating the high pressure pump by controlling the solenoid valve with a predetermined closing angle; measuring the real pressure of the fuel inside the common rail again; determining a pressure deviation between the real pressure and an expected pressure of the fuel, and correcting the nominal functioning feature according to this deviation.

11 Claims, 2 Drawing Sheets

(56) References Cited

U.S. PATENT DOCUMENTS

| | | | | |
|---|---|---|---|---|
| 7,856,960 | B2 * | 12/2010 | Serra et al. | 123/446 |
| 7,891,340 | B2 * | 2/2011 | Surnilla et al. | 123/457 |
| 8,240,290 | B2 * | 8/2012 | Miyake et al. | 123/446 |
| 8,333,109 | B2 * | 12/2012 | Migueis et al. | 73/114.45 |
| 2003/0172720 | A1 * | 9/2003 | Sweetland et al. | 73/49.7 |
| 2005/0092301 | A1 * | 5/2005 | Fukuda | 123/446 |
| 2008/0314364 | A1 | 12/2008 | Okamoto | |
| 2009/0076711 | A1 * | 3/2009 | Serra et al. | 701/103 |
| 2009/0139489 | A1 * | 6/2009 | Serra et al. | 123/456 |
| 2009/0276141 | A1 * | 11/2009 | Surnilla et al. | 701/103 |
| 2013/0013175 | A1 * | 1/2013 | Nistler et al. | 701/112 |

FOREIGN PATENT DOCUMENTS

| | | | |
|---|---|---|---|
| EP | 1967721 | A2 | 9/2008 |
| EP | 2037111 | A1 | 3/2009 |
| EP | 2042720 | A1 | 4/2009 |

* cited by examiner

METHOD FOR THE SELF-LEARNING OF THE VARIATION OF A NOMINAL FUNCTIONING FEATURE OF A HIGH PRESSURE VARIABLE DELIVERY PUMP IN AN INTERNAL COMBUSTION ENGINE

CROSS-REFERENCE TO RELATED APPLICATION

This application claims priority under 35 U.S.C. §119 to Italian Patent Application No. B02009A-000374, filed on Jun. 9, 2009 with the Italian Patent and Trademark Office, the disclosure of which is incorporated herein in its entirety by reference.

TECHNICAL FIELD

The present invention relates to a method for the self-learning of the variation of a nominal functioning feature of a high pressure variable delivery pump in an internal combustion engine.

PRIOR ART

In a direct injection assembly of the common rail type for an internal combustion engine of a motor vehicle, using a high pressure pump is known, which pump receives a fuel flow from a tank by means of a low pressure pump and feeds the fuel to a common rail. The common rail is hydraulically connected to a plurality of injectors, each of which is in turn connected to a respective cylinder and is adapted to inject fuel directly into the corresponding cylinder.

In such an injection assembly, the various components, and in particular the high pressure pump, are subjected to very high stresses during their normal operation. These stresses are mainly due to the high values of the concerned pressures and to the impurities normally present in the fuels which are currently available on the market. These stresses result in the high pressure pump operating under highly hard working conditions, thus causing a deterioration of the normal functioning feature of the pump itself over time.

Furthermore, manufacturing differences may be introduced during the production cycle, obviously in an undesired manner, which cause high pressure pumps to display mutually different functioning features. Being able to reduce the manufacturing costs is obviously an advantage, even if some behavior differences of the high pressure pumps should be accepted, but which may be compensated for during the control step.

As known, in a direct injection assembly of the above-described type, the pressure of the fuel in the common rail should be constantly monitored according to the crank point for keeping the fuel pressure in the common rail equal to a required value.

The lack of uniformity of the nominal functioning feature of the high pressure pump, either due to the deterioration of the pump itself or to production or assembly dispersion thereof, is therefore very dangerous for the injection system because it does not allow to correctly check the fuel pressure inside the common rail and, therefore, also the amount of fuel which is injected into each cylinder through the injectors.

The known injection assembly described hereto does not allow to recognize possible variations of the nominal functioning feature of the high pressure pump with the accuracy and speed theoretically required to control the pump itself according to the actual nominal functioning feature while keeping the motor vehicle driver's comfort and safety unchanged.

DESCRIPTION OF THE INVENTION

It is the object of the present invention to provide a method for self-learning the variation of a nominal functioning feature of a high pressure, variable delivery pump in an internal combustion engine, which method is free from the drawbacks of the prior art, allows to increase the level of reliability of the internal combustion engine, and is easy and cost-effective to be implemented.

According to the present invention, a method for self-learning the variation of a nominal functioning feature of a high pressure, variable delivery pump in an internal combustion engine is provided as claimed in the attached claims.

BRIEF DESCRIPTION OF THE DRAWINGS

The present invention will now be described with reference to the accompanying drawings, which illustrate a non-limitative embodiment thereof, in which.

PREFERRED EMBODIMENTS OF THE INVENTION

Figure 1:
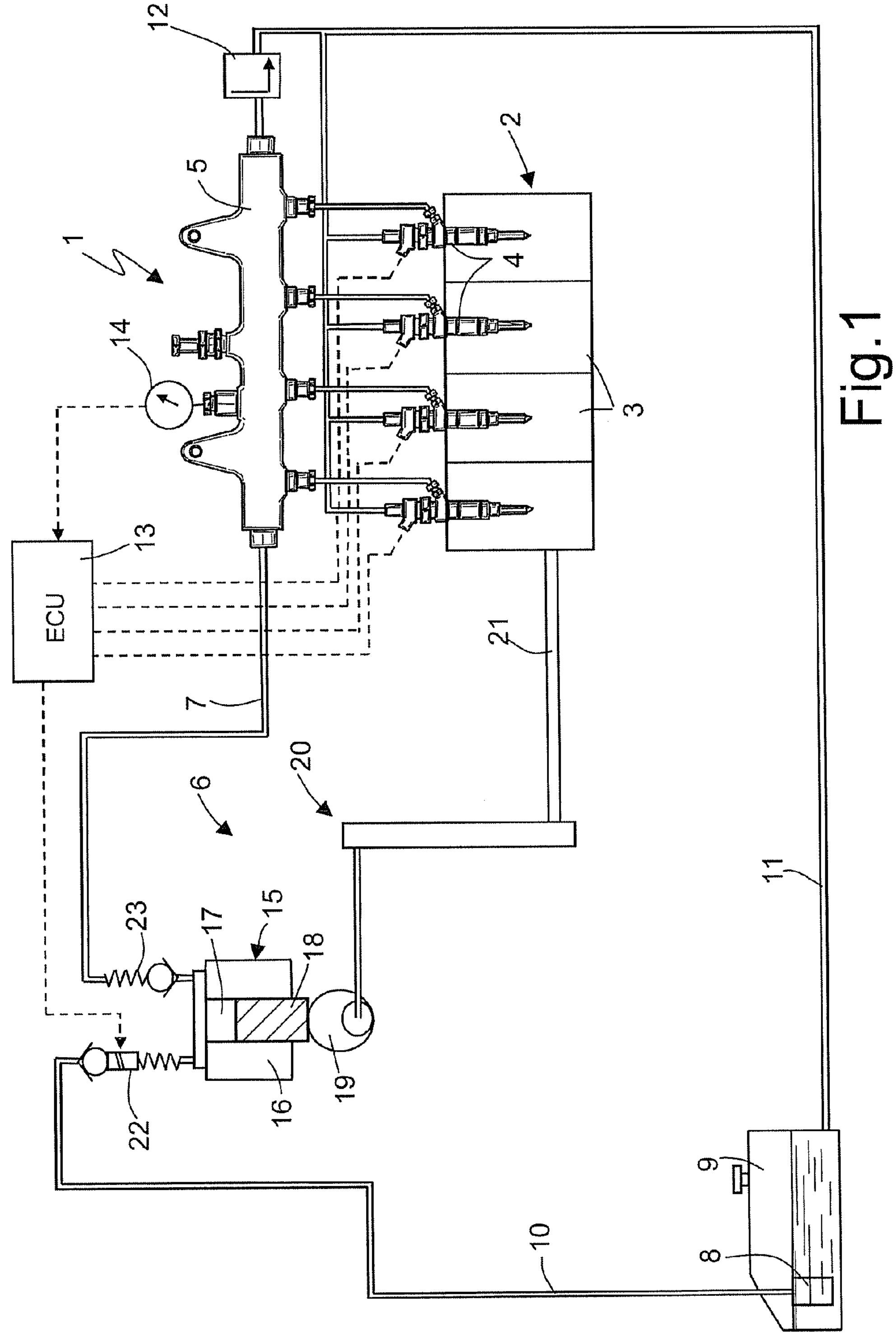
FIG. 1 diagrammatically illustrates, partially in blocks, a preferred embodiment of the injection assembly of an internal combustion engine according to the present invention.

In FIG. 1, numeral 1 indicates as a whole an injection assembly of the common rail type for the direct injection of fuel into an internal combustion engine 2 provided with four cylinders 3.

The injection assembly 1 comprises four injectors 4, of known type, each of which is connected to a respective cylinder 3 and is adapted to directly inject fuel into the corresponding cylinder 3 and to receive the pressurized fuel from a common rail 5.

The injection assembly 1 further comprises a high pressure, variable delivery pump 6, which is adapted to feed the fuel to the common rail 5 by means of a delivery pipe 7; and a low pressure pump 8, which is arranged within a fuel tank 9 and is adapted to feed the fuel to an intake pipe 10 of the high pressure pump 6, which intake pipe 10 is provided with a fuel filter (not shown).

The injection assembly 1 also comprises a return channel 11, which leads into the tank 9 and is adapted to receive the excess fuel both from the injectors 4, and from a mechanical, pressure limiting valve 12 which is hydraulically connected to the common rail 5. The valve 12 is calibrated to automatically open when the pressure of the fuel inside the common rail 5 exceeds a safety value to ensure the tightness and safety of the injection assembly 1.

Each injector 4 is adapted to inject a variable amount of fuel into the corresponding cylinder 3 under the control of an electronic control unit 13 being part of the injection assembly 1. As previously mentioned, each injector 4 is hydraulically actuated and should receive an amount of high pressure fuel from the common rail 5 which is sufficient to actuate a corresponding needle (not shown) and to feed the corresponding cylinder 3 at a relatively high pressure. To do so, each injector 4 is fed with an excess fuel amount as compared to that actually injected, and by means of the return channel 11, the excess is fed to the tank 9 upstream of the low pressure pump 8.

The electronic control unit 13 is connected to a sensor 14 for measuring the fuel pressure inside the common rail 5 and feedback controls the delivery of the high pressure pump 6 so as to keep the pressure of the fuel inside the common rail 5 equal to a desired value generally variable over time according to the crank point.

The high pressure pump 6 comprises a pumping element 15, formed by a cylinder 16 having a pumping chamber 17, in which a movable piston 18 slides in a reciprocal motion under the bias of a cam 19 actuated by a mechanical transmission 20 which receives the motion from a drive shaft 21 of the internal combustion engine 2. The compression chamber 17 is equipped with an intake solenoid valve 22, in communication with the intake pipe 10, and with a corresponding delivery valve 23 in communication with the delivery pipe 7.

The intake solenoid valve 22 is electromagnetically actuated, is controlled by the electronic control unit 13 and is of the open/closed (on/off) type; in other words, the solenoid valve 22 may take a fully open position or a fully closed position only, and its control is angularly phased with the high pressure pump 6. In particular, the solenoid valve 22 has a sufficiently wide introduction section to allow the pumping element 15 to be fed without causing any pressure drop.

The delivery of high pressure pump 6 is controlled by using the solenoid valve 22 only, which is feedback controlled by the electronic control unit 13 according to the fuel pressure in the common rail 5. In particular, the electronic control unit 13 determines instant-by-instant the desired value of the fuel pressure in the common rail 5 according to the crank point, and therefore adjusts the instantaneous delivery of fuel fed by the high pressure pump 6 to the common rail 5 so as to follow the desired value of the fuel pressure inside the common rail 5 itself. In order to adjust the instantaneous delivery of the fuel fed by the high pressure pump 6 to the common rail 5, the electronic control unit 13 adjusts the instantaneous delivery of fuel aspirated by the high pressure pump 6 through the solenoid valve 22 by varying the closing instant of the solenoid valve 22 itself during the compression step.

The solenoid valve 22 may be of two different types, to be chosen during a step of designing. According to a first variant, the suction solenoid valve 22 is normally open. This means that when the solenoid valve 22 is not controlled during the compression step it remains open and the fuel flows back to the lower pressure pump 8. The step of pumping the high pressure fuel to the common rail 5 starts instead when the solenoid valve 22 is controlled and closes during the compression step. In the case of suction, solenoid valve 22 being normally open, the solenoid valve 22 itself is closed by means of an electric control during the step of compressing the piston 18 of the pumping element 15 to allow the fuel to be conveyed into the common rail 5.

In the second case, instead, the suction solenoid valve 22 is normally closed. This means that when the solenoid valve 22 is controlled during the compression step, it remains open and fuel flows back to the lower pressure pump 8. The fuel sent to the high pressure pump 6 through the intake pipe 10 is aspirated by the pumping element 15 which is carrying out the intake stroke in that instant. On the other hand, the step of pumping the high pressure fuel to the common rail 5 starts when the solenoid valve 22 is no longer controlled during the compression step of the piston 18 and closes.

In both cases (i.e. both with the suction solenoid valve 22 normally closed and with the suction solenoid valve 22 normally open), the variable determining the control of the injection assembly 1 is the closing angle of the solenoid valve 22. Indeed, the longer the closing instant of the intake solenoid valve 22 is delayed, the more the flow back fuel amount is directed to the low pressure circuit (i.e. into the intake pipe 10), and therefore the lower the amount of fuel delivered to the common rail 5.

In the case of normally open solenoid valve 22, the closing angle of the solenoid valve 22 coincides, despite of inevitable electromechanical delays, with the control start angle of the suction solenoid valve 22 normally open, while it substantially corresponds to the control end angle of the suction solenoid valve 22 normally closed.

In both cases, however, it is very important to highly accurately control the closing of the solenoid valve 22 (by means of the closing angle thereof) to allow the amount of fuel required by the pressure control to be introduced into the injection common rail 5.

Figure 2:
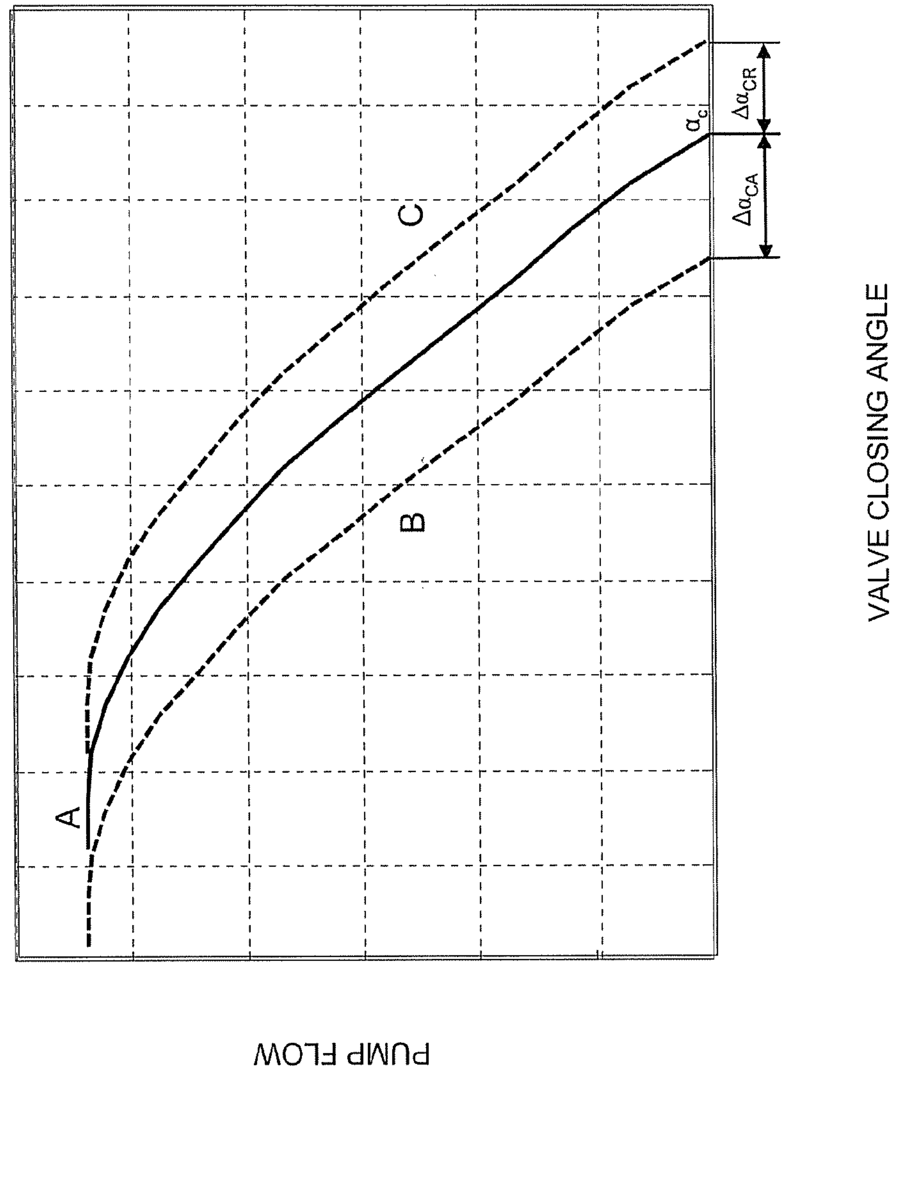
FIG. 2 shows the functioning feature of a high pressure pump of the internal combustion engine in FIG. 1.

As shown in greater detail in FIG. 2, the nominal functioning feature A of the high pressure pump 6 is shown by a curve which is similar for actuating all high pressure pumps 6. The control algorithm of the high pressure pump 6 normally includes an open loop control of the high pressure pump 6 itself. In particular, the closing angle of the solenoid valve 22 may be determined availing of the normal functioning feature A and knowing the objective fuel amount to be introduced into the common rail 5.

The nominal functioning feature A varies according to some parameters such as, for example, delivery pressure, the speed of the internal combustion engine 2, and the temperature of the fuel in use. The nominal functioning feature A is the behavior under reference conditions of the high pressure pump 6 and is used by the electronic control unit 13 for determining the closing angle of the solenoid valve 22 according to the objective delivery.

In normal functioning conditions, the electronic control unit 13 requires the high pressure pump 6 keeping an objective pressure; to do so, the electronic control unit 13 determines an objective delivery to be processed by the high pressure pump 6, with the aid of a closed loop controller. The objective delivery of the high pressure pump 6 is converted into the closing angle of the solenoid valve 22 by means of the nominal functioning feature A.

Knowing the variation of the actual functioning feature as compared to the nominal functioning feature A the closing angle of the solenoid valve 22 may be accurately calculated, by adding the correction angle $\Delta\alpha_C$ to the nominal control angle according to the following formula:

$$\alpha=\alpha_N(Q_T)+\Delta\alpha_C$$

$\alpha$: corrected closing control angle of the solenoid valve 22;

$\alpha_N(Q_T)$: closing control angle of the solenoid valve 22 according to the nominal functioning feature A, according to the objective delivery $Q_T$;

$\Delta\alpha_C$: correction closing angle of the solenoid valve 22.

Obviously, in the case of a normally open solenoid valve 22, the desired closing angle of the solenoid valve 22 being known, the electric control start angle (anticipated with respect to the closing, to compensate for the electromagnetic delays) and the electric control end angle (postponed with respect to the closing, as keeping the valve forcedly closed to allow the piston 18 during the compression step to take the fuel in the chamber 17 to a pressure sufficient to keep the solenoid valve 22 itself closed) may be calculated.

In case of normally closed solenoid valve 22, instead, the electric control start angle (from the beginning of the intake step) and the electric control end angle (anticipated with respect to the closing of the solenoid valve 22 to compensate for the electromechanical delays) may be calculated with the desired closing angle of the solenoid valve 22 being known.

As shown in greater detail in FIG. 2, the nominal functioning feature A further allows to determine the closing angle $\alpha_c$, to which zero delivery corresponds. Determining the zero delivery angle $\alpha_c$ is fundamental because its recognition allows to identify the angle $\alpha_c$, from which the delayed closing angles, with respect to the zero delivery angle $\alpha_c$, determine a zero delivery, while the anticipated closing angles with respect to the zero delivery angle $\alpha_c$ determine non zero deliveries, increasing as moving away from the zero delivery angle $\alpha_c$ itself.

As a consequence of the inevitable drifts incurred by the high pressure pump 6 and by the connection pipes with the common rail 5, and due to the inevitable production and assembly dispersions, the actual functioning feature tends not to coincide with the nominal functioning feature A, i.e. it undergoes variations such that a given closing angle of the solenoid valve 22 may correspond to very different fuel deliveries (either higher or lower) of the expected delivery according to the nominal functioning feature A.

The alterations occurring in the actual functioning feature as compared to the nominal functioning feature A make it indeed impossible to control the closing of the solenoid valve 22 to obtain a given delivery.

The control strategy defined to recognize and learn possible variations of the nominal functioning feature A is illustrated in detail below. Such a strategy is implemented by the electronic control unit 13, which further adapts the control of the high pressure pump 6 to the learnt variations of the nominal functioning feature A.

It is worth noting that the control strategy firstly includes functioning only when the internal combustion engine 2 is in cut-off conditions, so that the control strategy implemented by the electronic control unit 13 is not affected by possible pressure drops caused by the injectors 4.

The control strategy then includes determining leaks which occur in the common rail 5 due to blow-by. It can be indeed assumed that in cut-off conditions of the internal combustion engine 2, the only pressure drops to be estimated are imputed to fuel leaks occurring in the common rail 5, as pressure drops due to the delivery of fuel by the injectors 4 are not present. Fuel leaks in the common rail 5 are due to fuel blow-by, which is perceived by the electronic control unit 13 as a pressure drop inside the common rail 5 itself and in general in the entire high pressure circuit.

The first contribution which may be recognized by the strategy thus relates to the localized leaks in the common rail 5 at cut-off working conditions of the internal combustion engine 2. For the purpose, a diagnostic parameter for the leaks in the common rail 5 is used, which parameter depends on the pressure variation $\Delta P_{eff}$ in the common rail 5 in a calibratable width test time interval $\Delta t$.

Once the internal combustion engine 2 is in cut-off conditions, if no malfunctions are present and a reliable estimate of the pressure value in the common rail 5 may be obtained, the common rail 5 is taken to a predetermined pressure value, a zero delivery of the high pressure pump 6 is overridden, and a first instantaneous value of the pressure $P_1$ in the common rail 5 is detected. Once a test time interval $\Delta t$ has elapsed, a second instantaneous value of pressure $P_2$ inside the common rail 5 is detected. In particular, the duration of the time interval $\Delta t$ is such that it covers a number N of engine cycles, where N is a presettable value.

The pressure variation $\Delta P_{eff}$ in the common rail 5 in a test time interval $\Delta t$ is clearly given by the difference between the pressure value $P_2$ at the end of the test time interval $\Delta t$ (i.e. at an instant $t_2$) and the pressure value $P_1$ at the beginning of the test time interval $\Delta t$ (i.e. at an instant $t_1$).

The contribution of the leaks $\Delta P_{leak}$ which occur in the common rail 5 is equal to the ratio of the pressure variation $\Delta P_{eff}$ in the test time interval $\Delta t$ to the time interval $\Delta t$ itself (equal to the difference between $t_2$ and $t_1$), i.e.:

$$\Delta P_{leak} = \frac{P_2 - P_1}{t_2 - t_1}$$

$t_1$: initial time instant of a calibratable width time interval $\Delta t$;

$P_1$: pressure value within the common rail 5 at instant $t_1$;

$t_2$: final time instant of a calibratable width time interval $\Delta t$;

$P_2$: pressure value within the common rail 5 at instant $t_2$.

The leaks value $\Delta P_{leak}$ is thus the decrease incurred by the pressure within the common rail 5 due to the blow-by.

Once the leak value $\Delta P_{leak}$ has been determined, the control strategy includes detecting the pressure value P within the common rail 5 and enabling the functioning of the high pressure pump 6 for a number of cycles N' of the internal combustion engine 2, where N' is a presettable number.

During the N' engine cycles, the electronic control unit 13 controls the solenoid valve 22 so that the closing angle corresponds, in the nominal functioning feature A, to a predetermined fuel delivery. According to a preferred embodiment, the predetermined fuel delivery is a zero fuel delivery. Therefore, in other words, the solenoid valve 22 is controlled with a closing angle which, in this step, corresponds to the zero delivery angle $\Delta_c$. Therefore, the fuel delivery towards the common rail 5 should be zero.

At the end of N' engine cycles (which correspond to a time interval $\Delta t'$, the duration of which depends on the speed of the internal combustion engine 2), the electronic control unit 13 detects the real pressure value $P_{real}$ within the common rail 5 again. The electronic control unit 13 then corrects the real pressure value $P_{real}$ with the previously determined pressure leaks value $\Delta P_{leak}$ due to blow-by.

The electronic control unit 13 establishes the expected pressure value $P_{exp}$ in the common rail 5 at the end of the N' engine cycles according to a series of variables, including the pressure value P at the beginning of the N' engine cycles, the predetermined fuel delivery, and the pressure leaks $\Delta P_{leak}$ caused by blow-by.

If the predetermined fuel delivery is a zero fuel delivery, the expected pressure $P_{exp}$ may be calculated as follows:

$$P_{exp} = P'_1 + \Delta P_{leak} * (t'_2 - t'_1)$$

$t'_1$: initial time instant of a time interval $\Delta t'$ having a width equal to N' engine cycles;

$P'_1$: pressure value within the common rail 5 at instant $t'_1$;

$t'_2$: final time instant of a time interval $\Delta t'$ having a width equal to N' engine cycles;

$\Delta P_{leak}$ pressure drops due to blow-by in the common rail 5.

If the predetermined fuel delivery is not a zero fuel delivery, a further contribution given by the increasing expected pressure $P_{exp}$ due to the fuel delivery should be considered. In this case, the expected pressure $P_{exp}$ is calculated as follows:

$$P_{exp} = P'_1 + \Delta P_{leak} * (t'_2 - t_1) + Q_T * N' * K_{SYS}$$

$t'_1$: initial time instant of a time interval $\Delta t'$ having a with equal to N' engine cycles;

$P'_1$: pressure value within the common rail 5 at instant $t'_1$;

$t'_2$: final time instant of a time interval $\Delta t'$ having a width equal to N' engine cycles;

$\Delta P_{leak}$ pressure drops due to blow-by in the common rail 5;

$Q_T$: predetermined fuel delivery introduced in each of the N' engine cycles;

$K_{SYS}$: rigidity of the high pressure circuit (which term generally depends on temperature, fuel pressure, fuel compressibility and pipe elasticity).

In both cases, once the expected pressure value $P_{exp}$ has been obtained, the expected pressure value $P_{exp}$ is compared with the real pressure value $P_{real}$ at the end of the N' engine cycles within the common rail 5 and the deviation between these two values $P_{exp}$ and $P_{real}$ is determined.

Two situations may substantially occur with regards to the comparison between the two pressure values $P_{exp}$ and $P_{real}$.

In the first case, the real pressure value $P_{real}$ is not higher than the expected pressure value $P_{exp}$ at the end of the N' engine cycles. This means that the nominal functioning feature A is indeed moved leftwards, as shown in greater detail in FIG. 2. By recognizing the leftward shift of the functioning feature, the correction angle $\Delta\alpha_C$ is evolved by decreasing it by a calibratable value $\delta_{CA}$.

The new value of the correction angle $\Delta\alpha_C$ is immediately stored and taken into consideration by the system when calculating the closing angle of solenoid valve 22 in the previously shown formula.

At this point, the electronic control unit 13 controls the solenoid valve 22 for further N' engine cycles so that the closing angle corresponds, in the nominal functioning feature A, to a predetermined fuel delivery and by correcting the obtained value with the new value of the correction angle $\Delta\alpha_C$.

After the detection of the real pressure value $P_{real}$ at the end of N' engine cycles in the common rail 5, the expected pressure $P_{exp}$ is calculated as seen above and the method checks again whether the real pressure value $P_{real1}$ is lower than the expected pressure value $P_{exp}$ at the end of the N' engine cycles.

The checking cycle is iteratively repeated to check the correctness of the performed diagnostics. The checking cycle is interrupted only when, at a given closing angle of the solenoid valve 22, the real pressure value $P_{real}$ in the common rail 5 increases with respect to the expected pressure $P_{exp}$ at the closing angle.

This means that a pressure increase higher than a presettable width threshold value $\Delta P_{th}$, with respect to the expected variation, has occurred in the common rail 5. When this condition is checked, the self-learnt correction angle $\Delta\alpha_C$ does not further evolve but it is decreased by the correction parameter $\delta_{CA}$, and the procedure is terminated. The self-learnt correction angle $\Delta\alpha_C$ to which this condition corresponds is stored by the electronic control unit 13 and used by the control strategy to update the nominal functioning feature A, which is now represented by the curve indicated by B in FIG. 2. The actual functioning feature B corresponds to a translation of the nominal functioning feature A equal to the overall advance value $\Delta\alpha_{CA}$ obtained during the checking cycle.

In the second case, the real pressure value $P_{real}$ is higher than the expected pressure value $P_{exp}$ at the end of the N' engine cycles. In this second case, two conditions may occur, i.e. the nominal functioning feature A remains unchanged (i.e. it is still identifiable by the curve A in FIG. 2) or is shifted rightwards (i.e. it is identifiable by the curve C in FIG. 2).

In order to discriminate between these two possibilities, the difference between $P_{real}$ and $P_{exp}$ is checked: if it is higher than a calibratable threshold, a rightward shift of the actual functioning feature is recognized.

If this occurs, thus recognizing a possible variation of the nominal functioning feature A, the electronic control unit 13 recognizes that the self-learnt correction angle $\Delta\alpha_C$ is evolved by increasing it by a calibratable amount $\delta_{CR}$.

The new value of the self-learnt correction angle $\Delta\alpha_C$ is immediately stored and taken into consideration by the system when calculating the closing angle of solenoid valve 22 in the previously shown formula.

At this point, the electronic control unit 13 controls the solenoid valve 22 for further N' engine cycles, so that the closing angle corresponds, in the nominal functioning feature A, to a predetermined fuel delivery and by correcting the obtained value with the new value of the correction angle $\Delta\alpha_C$. After the detection of the real pressure value $P_{real1}$ at the end of N' engine cycles in the common rail 5, the expected pressure $P_{exp}$ is calculated as seen above and the method checks again whether the real pressure value $P_{real1}$ is higher than the expected pressure value $P_{exp}$ at the end of the N' engine cycles.

The checking cycle is iteratively repeated to check the correctness of the performed diagnostics. The checking cycle is interrupted only when the condition occurs whereby, at a given closing angle of the solenoid valve 22, the real pressure value $P_{real}$ within the common rail 5 is not higher than the expected pressure $P_{exp}$ at the closing angle.

This means that a pressure increase has occurred in the common rail 5, which is lower than a presettable width threshold value $\Delta P_{th}$, as compared to the expected variation. When this condition is checked, the self-learnt correction angle $\Delta\alpha_C$ is not further evolved, thus increasing it by the correction parameter $\delta_{CA}$, and the procedure is terminated. The self-learnt correction angle $\Delta\alpha_C$ to which this condition corresponds, is stored by the electronic control unit 13 and used by the control strategy to update the nominal functioning feature A, which is now represented by the curve indicated by C in FIG. 2. The actual functioning feature C corresponds to a translation of the nominal functioning feature A equal to the overall delay value $\Delta\alpha_{CR}$ obtained during the checking cycle.

In both cases, the self-learnt correction angle $\Delta\alpha_{CR}$, $\Delta\alpha_{CA}$ which has been learnt at the end of the control strategy described hereto, is stored and used by the electronic control unit 13 during the next engine cycles to control the high pressure pump 6.

In both cases, the strategy is interrupted if the electronic control unit 13 asks the internal combustion engine 2 to exit the cut-off step needed by the strategy itself; in this case, the self-learnt correction angle $\Delta\alpha_C$ remains updated according to the last checked value.

According to a preferred embodiment, the absolute value of the advance $\delta_{CA}$ and delay $\delta_{CR}$ correction parameters is variable and determined by the electronic control unit 13 according to the deviation detected between the real pressure value $P_{real}$ and the expected pressure value $P_{exp}$.

It is worth noting that in fact the control strategy described hereto includes determining the angular variation (equal to the advance value $\Delta\alpha_{CA}$ or delay value $\Delta\alpha_{CR}$, respectively) which is applied to the nominal functioning feature A which is stored in the electronic control unit 13, so that it is adapted to the real behavior of the high pressure pump 6. The actual functioning features B, C which are originated thus represent a rightwards or leftwards shift of a value equal to $\Delta\alpha_{CA}$ or to $\Delta\alpha_{CR}$ of the nominal functioning feature A even though the deterioration of the nominal functioning feature A does not simply correspond to a rightward or leftward shift. This solution is in all cases a good compromise because the strategy described hereto allows to estimate with good accuracy the closing angle of the solenoid valve 22 with zero delivery, which is a point of the nominal functioning feature A which should be fundamentally recognized.

According to a preferred embodiment, in order to better adapt the strategy to the real behavior of the high pressure pump 6, the self-learning of the deviation of the nominal functioning feature A is repeated for various objective delivery values so as to correct the nominal functioning feature A not only as a rigid translation (rightwards or leftwards translation), but also as a continuous correction closest to the reality by the interpolation of various values. Moreover, the self-learning of the deviation of the nominal functioning feature A for various objective delivery values may not be repeated at consecutive instants of time.

According to a preferred embodiment the self-learning of the deviation of the nominal functioning feature A is repeated for several functioning points of the engine; more in detail, for different pressure and temperature values of the fuel in use and for different speeds of the internal combustion engine 2.

It is apparent that the control strategy described hereto has many advantages.

Firstly, the implementation of this strategy solves the malfunctions due to inevitable drifts of the components of the injection assembly 1 and, in particular of the high pressure pump 6, in addition to unexpected damages which are difficult to be estimated and are caused, for example, by the impurities present in the fuel which is used in the internal combustion engine 2. Therefore, the useful working life of the high pressure pump 6 may be increased, and similarly this compensates for low design, construction and assembly accuracy, thus being able to reduce the costs of the final product while availing of a constantly updated, nominal functioning feature A which reflects the real functioning thereof without damaging the vehicle driver's comfort and safety.

The invention claimed is:

1. Method for the self-learning of the variation of a nominal functioning feature of a high pressure pump in an injection assembly of an internal combustion engine; the high pressure pump feeds the fuel to a common rail connected to injectors and is controlled by a solenoid valve depending on an objective pressure inside said common rail and using the nominal functioning feature which provides a delivery of fuel pumped in the common rail according to a closing angle of the solenoid valve; the method for the self-learning comprises, when the internal combustion engine is in a cut-off condition, the steps of:

determining the value of the pressure leaks due to blow-by in the common rail;

measuring the real pressure of the fuel inside the common rail;

actuating the high pressure pump for a given number of learning cycles controlling the solenoid valve with a closing angle corresponding in the nominal functioning feature to a predetermined learning delivery of fuel;

measuring the real pressure of the fuel inside the common rail at the end of the learning cycles;

estimating the expected pressure of the fuel inside the common rail at the end of the learning cycles according to the real pressure of the fuel inside the common rail before the learning cycles, according to the pressure leaks due to blow-by, according to the predetermined learning delivery of fuel and according to the stiffness of the system;

determining a pressure deviation between the real pressure and the expected pressure of the fuel inside the common rail at the end of the learning cycles; and updating a correction angle of the nominal functioning feature according to the pressure deviation.

2. Method for the self-learning according to claim 1 and comprising the further steps of:

determining the value of a correction parameter according to the pressure deviation; and updating the correction angle of the nominal functioning feature by adding algebraically the correction parameter to the correction angle of the nominal functioning feature.

3. Method for the self-learning according to claim 2 and comprising the further step of determining the absolute value of the correction parameter according to the absolute value of the pressure deviation.

4. Method for the self-learning according to claim 2 and comprising the further step of recognizing a decrease in the correction angle of the nominal functioning feature in correspondence of the predetermined learning delivery of fuel when the real pressure is lower than the expected pressure.

5. Method for the self-learning according to claim 2 and comprising the further step of recognizing an increase in the correction angle of the nominal functioning feature in correspondence of the predetermined learning delivery of fuel when the real pressure is higher than the expected pressure.

6. Method for the self-learning according to claim 4 and comprising the further step of repeating the learning cycles in order to update in a continuative manner the correction angle of the nominal functioning feature; the update is carried out by adding algebraically the correction parameter to the correction angle of the nominal functioning feature.

7. Method for the self-learning according to claim 1, wherein the predetermined learning delivery of fuel is equal to a minimum fuel delivery towards the common rail.

8. Method for the self-learning according to claim 1 and comprising the further step of actuating the high pressure pump by controlling the solenoid valve with different closing angles corresponding in the nominal functioning feature to different predetermined learning deliveries of fuel, in order to obtain a correction which applies to the whole functioning field of the high pressure pump.

9. Method for the self-learning according to claim 1 and comprising the further steps of:

determining a plurality of values of the correction angles of the nominal functioning feature for each predetermined learning delivery of fuel; and interpolating the different values of the obtained correction angles.

10. Method for the self-learning according to claim 1 and comprising the further steps of: measuring the speed of the internal combustion engine and the pressure and temperature values of the fuel in use; and updating the correction angles of the nominal functioning feature according to the pressure and the temperature of the fuel in use and according to the speed of the internal combustion engine.

11. Method for the self-learning according to claim 1 and comprising the further steps of:

reaching a pressure value which is preset and can be calibrated inside the common rail; and determining the value of the pressure leaks due to blow-by taking place in the common rail according to the ratio between a pressure variation inside the common rail during a test time interval, in which the high pressure pump is deactivated, and test time interval itself.

* * * * *